United States Patent [19]

Richardson et al.

[11] 4,030,548

[45] June 21, 1977

[54] ECONOMICALLY DISSOLVING BARIUM SULFATE SCALE WITH A CHELATING AGENT

[75] Inventors: Edwin A. Richardson, Houston; Ronald F. Scheuerman, Bellaire, both of Tex.

[73] Assignee: Shell Oil Company, Houston, Tex.

[22] Filed: Apr. 28, 1976

[21] Appl. No.: 680,937

[52] U.S. Cl. .................................. 166/279; 134/2; 210/58; 252/80; 252/8.55 B; 166/312
[51] Int. Cl.² .................. C02B 5/06; C23F 14/02; E21B 43/27
[58] Field of Search ............... 166/244 C, 312, 311, 166/279, 310, 307, 305 R; 252/8.55 B, 80; 210/58; 134/2

[56] References Cited

UNITED STATES PATENTS

| | | | |
|---|---|---|---|
| 2,777,818 | 1/1957 | Gambill | 252/8.55 B |
| 3,523,582 | 8/1970 | Fulford | 166/310 X |
| 3,660,287 | 5/1972 | Quattrini | 166/311 X |
| 3,684,720 | 8/1972 | Richardson | 252/8.55 B X |
| 3,688,829 | 9/1972 | Jones | 166/312 X |
| 3,793,209 | 2/1974 | Thompson | 252/8.55 B X |

*Primary Examiner*—Stephen J. Novosad

[57] ABSTRACT

A barium sulfate scale or solid can be dissolved economically by flowing a stream of relatively dilute aqueous solution of aminopolyacetic acid salt chelating agent into contact with and along the surfaces of the scale while correlating the composition and flow rate of the solution so that each portion of solution contains an amount of chelant effective for dissolving barium sulfate and the upstream portions of the scale are contacted by portions of the solution which are unsaturated regarding the barium-chelant complex.

5 Claims, No Drawings

ECONOMICALLY DISSOLVING BARIUM SULFATE SCALE WITH A CHELATING AGENT

BACKGROUND OF THE INVENTION

The invention relates to dissolving barium sulfate solid from locations in and around the boreholes of wells and/or other relatively remote locations into which a fluid can be flowed.

Various procedures for removing various type of scales with aminopolyacetic acid salt chelating agents, such as EDTA (ethylenediaminetetraacetic acid), have been known for at least about 30 years. For example, U.S. Pat. No. 2,396,938 (filed in 1944) describes removing boiler scale with aqueous solutions of such a chelant and an alkali meta hydroxide. U.S. Pat. No. 2,802,788 (filed in 1952) describes a radiator cleaning composition in which such a chelant salt is included in an aqueous solution along with an inorganic chelant, e.g., sodum tripolyphosphate. U.S. Pat. No 3,308,065 (filed in 1963)describes a substantially one-pore volume treatment for removing calcium sulfate-containing scale with an ammoniated or aminated chelant, e.g., an ammonium salt of EDTA. U.S. Pat. No. 3,660,287 (filed in 1967) describes a similar treatment for dissolving calcium sulfate-containing scale with a mixture of an EDTA salt and a water soluble inorganic carbonate salt. Such prior processes were consistent in utilizing an amount of solution which about filled one pore volume of the region within which the scale was to be removed and using a concentration of chelant such that that volume of the solution contained a stoichiometric excess relative to the amount of scale to be dissolved.

SUMMARY OF THE INVENTION

The present invention relates to dissolving a barium sulfate scale from a subterranean or other relatively remote location into which fluid can be flowed. Fluid is flowed into the remote location so that a stream of fluid contacts and flows along the surface of the scale. The composition and flow rate of the fluid are adjusted so that (a) the scale is contacted by a stream of aqueous solution in which each portion contains enough dissolved aminopolyacetic acid salt chelating agent to dissolve barium sulfate, and (b) substantially all upstream portions of the scale are contacted by a succession of portions of the aqueous liquid which are substantially unsaturated with respect to dissolved barium-chelant complex.

DESCRIPTION OF THE INVENTION

The prior scale removing treatments used relatively concentrated solutions of reactants for dissolving or reacting with the scale components. The volumes of the solutions were large enough to substantially fill the pore volume of the scale-containing region and contact substantially all portions of the scale. The solutions were then flowed into the scale-containing regions and kept static or, if feasible, recycled or stirred (e.g., by injecting pressurized gas in a well-bore being treated) to speed up the diffusion and dispersion of dissolved and/or suspended particles of scale. In such prior treatments the aminopolyacetic acid salt types of chelants were found to be generally effective with respect to removing calcium sulfate (gypsum) and/or magnesium sulfate or the like types of scales.

As known to those skilled in the art, for a scale-removing treatment to be commercially feasible, the economics must be reasonable. If a particular procedure requires expensive reagents and/or a long down time (during which a well or boiler or conduit system is out of operation) the procedure is, in effect, inoperative.

With respect to treating calcium, magnesium or the like scales, the substantially single-pore volume treatments with the aminopolyacetic acid salt chelants (e.g., EDTA salts) proved to be generally suitable. They were at least competitive with a two stage treatment such as first contacting the scale with a pressurized solution of ammonia and carbon dioxide in water and then contacting it with an aqueous acid, e.g., as described in U.S. Pat. No. 3,651,868.

But, the quantitative testing of such substantially one-pore-volume aminopolyacetic acid salt chelant scale-dissolving treatments on barium sulfate scales lead to the conclusion that the dissolving of barium sulfate was too slow to be economically feasible. Such tests involved measuring the amounts of calcium or barium sulfate scale dissolved by an aqueous solution containing more than enough EDTA to dissolve all of the scale (by forming a soluble calcium-EDTA or barium-EDTA complex) during a given duration of exposure with or without stirring. The tests indicated that, with calcium sulfate, as long as the EDTA salt was present in the aqueous solution in a stoichiometric excess with respect to the amount of calcium sulfate being contacted by the solution, the calcium sulfate would continue to dissolve at a rate such that a significant amount dissolved in a reasonable treatment time (e.g., 6 to 8 hours). But, with barium sulfate, although such a solution would dissolve some of the barium sulfate, the rate at which it dissolved seemed to be so slow that such a procedure was thought to be substantially inoperative in respect to an economically feasible removal of barium sulfate scale.

The present invention involves the discovery that when a chelant-containing solution which is, or is equivalent to, an EDTA salt solution contacts solid barium sulfate, the formation of a barium-EDTA complex is initially rapid. But, that reaction continues only until the concentration of that complex reaches a relatively low saturation value. For example, at a temperature of about 200° F, an aqueous solution of the barium-EDTA complex becomes saturated at about 0.02M. When the barium sulfate is contacted by such a saturated solution, with or without stirring or recycling, no more barium will dissolve. This low solubility, which limits the amount of barium sulfate that can ever be dissolved by a given batch of EDTA salt solution, may have been the reason that the prior relatively concentrated, one pore-volume soak-type treatments were unsuccessful. When such a soak type treatment was continued for a time long enough to dissolve significant amount of calcium sulfate, the amount of dissolved barium sulfate was very small.

But, when a barium sulfate scale is subjected to the present type of a once-through-dynamic wash treatment, even when the concentration of the chelant in the aqueous solution is relatively high, as long as the upstream portions of the barium sulfate are contacted by a succession of portions of the solution that are not saturated with the Ba-EDTA complex. And, because of the relatively high rate of dissolving, it is feasible to use a relatively low concentration of the chelant (such as only a slight excess over that equivalent to the barium-chelant complex saturation concentration).

The ability to use dilute solutions minimizes the cost of the present scale-removing treatments. For example, the solubility of the barium EDTA complex at 200° F (about 0.02M) corresponds to approximately one pound of barium sulfate per barrel of treating solution. Thus, since the dissolving consumes approximately 0.02–0.03M of EDTA, and since the EDTA salt is currently available at a cost of $1.00 per pound, the cost of the chemicals used in dissolving one pound of the barium sulfate scale can be less than about $5.00. This cost would be only $1,000 to $2,500 for removing 200 to 500 pounds of barium sulfate. Well stimulation experience with respect to siliceous reservoirs having permeabilities impaired by clay fines indicates that a removal of about 400 pounds of fine plugging material was sufficient to provide a significant stimulation of the well. In view of this, the dissolving of 200–300 pounds of barium sulfate is likely to significantly reduce the impairment due to such a scale.

The presently contemplated once-through-dynamic wash procedure may involve a distinctly different barium sulfate scale dissolving mechanism from those of the previously contemplated one — pore-volume procedures that used the same type of chelating agent. U.S. Pat. No. 3,660,287 indicates that, even with respect to the more readily soluble calcium sulfate, the rate of the scale-dissolving by a one-pore-volume slug of an EDTA salt tends to be undesirably slow, unless the solution contains a soluble inorganic carbonate salt. The presence of the carbonate salt is said to speed up the dissolving reaction to an extent such that ... "only static contact between the scale encrusted surface and the novel composition is required whereas formerly a recirculation type of treatment of scale was required". But, although the prior processes were strongly affected by the presence of such carbonates, in test of the present once-through-dynamic washing treatment of a barium sulfate scale, the presence of such carbonates were found to have little or no effect. The same lack of effect was found to be true of an alkali metal hydroxide such as sodium hydroxide.

The aqueous liquids suitable for dissolving the chelant used in the present process can comprise substantially any normally available waters. In such aqueous liquids the presence of dissolved alkali metal salts seem to cause little or no interference in the present process and may even be somewhat helpful. The presence of alkaline earth metal salts can also be tolerated as long as (1) the proportion of chelant is sufficient to provide the specified barium sulfate dissolving proportion in addition to the amount used in complexing with the alkaline earth metal ions, and (2) such alkaline earth metal ions do not include enough barium ions to saturate or substantially saturate the solution with the barium-chelant complex. Where the alkaline earth metal content is relatively high it may be economically advantageous to soften the water for example by conventional water-softening treatment.

In general, substantially any aminopolyacetic acid salt chelating agent that is substantially analogous to EDTA with respect to the solubility of its barium-chelant complex can be used in the present invention. Examples of such chelating agents include the salts of ethylenediameine tetraacetic acid, N-hydroxyethyl imino diacetic acid, diethylenetriamine pentaacetic acid, nitrilo triacetic acid, and the like. Salts of ethylenediamine tetraacetic acid (EDTA) are preferred.

In general, the concentration of the chelant salt in the aqueous solution used in the present process is preferably at least substantially equivalent to the saturation concentration of the barium-chelant complex in that solution. In general, it is preferable to use a concentration equivalent to not more than about 0.05 moles per liter of EDTA. The concentration is preferably that equivalent to from about 0.02 to 0.03 molar EDTa solution. The pH of the present chelant-containing solutions is preferably from about 6 to 14. A particularly preferred ramge of pH is from about 10 to 12.

The aqueous chelant-containing solution can, of course, contain substantially any of well-treating or cleaning solution additives which are compatible with the chelant-containing solution and its scale-dissolving action. Such additives can include solubilizing agents and surfactant materials, etc.

The scale-dissolving capabilities of the present once-through-dynamic washing treatment have been demonstrated in laboratory tests such as the following. Relatively finely divided particles of the barium sulfate and/or other scale forming materials to be dissolved were mixed with a No. 5 silica sand and formed into a sand pack.

In the tests which provided the data listed in Table 1, the sand packs contained 5% by weight of solid barium sulfate and the sand/sulfate mixture was placed in a glass tube sealed on each end with a fitting for receiving a fluid conduit. The test solutions were flowed through the packs at 200° F at rates casuing the solutions to have a 5–10 minute residence time within the packs, unless otherwise noted in the table. After equilibrium was established, the fluid in the pack outlet was analyzed for uncomplexed EDTA, and those measurements were compared with similar measurements on fluid samples obtained from the inlet of the sand pack. This procedure was found to provide a reliable measurement of the amount of barium-EDTA complex that was dissolved in the solution passing through the eynthetic scale-containing region. This analytical procedure was checked against standard atomic absorption analytical procedures for barium and found to be accurate.

The chelate-containing solutions were each formed by dissolving the indicated amounts of EDTA in 3% solutions of sodium chloride in water. As indicated in the table, various pH-adjusting chemicals were added to various ones of the solutions.

Table 1

| | pH Adjustment Chemical In | Pack Inlet[**] Moles EDTA[-4]/ | Ba(EDTA)$^{-2}$ in Pack Effluent After Equilibrium Condition Established | | |
|---|---|---|---|---|---|
| | | | Moles | Grams BaSO$_4$/ BaSO$_4$ | Pounds |
| 1 | .05M/l Na$_2$CO$_3$ | 10.9 .01[**] | .01 | 2.33 | 0.82 |
| 2 | .05M/l Na$_2$CO$_3$ | 10.9 .10[**] | .028 | 6.52 | 2.28 |
| 3 | .05M/l NaOH | 12.7 .15[**] | .026 | 6.06 | 2.12 |
| r | .05M/l NaOH | 12.5 .05[**] | .015 | 3.50 | 1.23 |
| 5 | .02M/l NaOH | 12.2 .05[**] | .014 | 3.26 | 1.14 |
| 6 | 0 | 10.3 .05 | .014 | 3.26 | 1.14 |
| 7 | 0 | 10.3 .05 | .010[*1] | 233 | 0.82 |
| 8 | 0 | 10.3 .05 | .011[*2] | 2.56 | 0.90 |
| 9 | 0 | 10.3 .05 | .007[*3] | 1.63 | 0.57 |
| 10 | 0 | 10.3 .05 | .015 | 3.50 | 1.23 |
| 11 | 0 | 10.3 .05[**] | .016 | 3.73 | 1.31 |
| 12 | 0 | 10.3 .05 | .013 | 3.03 | 1.06 |
| 13 | 0 | 10.3 .10 | .015 | 3.50 | 1.23 |
| 14 | 0 | 10.3 .05 | .016[*7] | 3.73 | 1.31 |
| 15 | 0 | 10.3 .05 | .019[**] | 4.43 | 1.55 |

Table 1-continued

| pH Adjustment Chemical In | Pack Inlet[b] Moles EDTA[-]/ | | Ba(EDTA)[-2] in Pack Effluent After Equilibrium Condition Established | | |
|---|---|---|---|---|---|
| | | Moles | Grams BaSO$_4$/ BaSO$_4$/ | Pounds | |
| 16 | 0 | 10.3 | .05 | .018** | 4.19 | 1.47 |

*[1]Four minutes retention - Temperatures slightly less than 200° F.
*[2]Two minutes retention - Temperatures slightly less than 200° F.
*[3]One minute retention - Temperatures much less than 200° F.
*[4]Versene 100 (aqueous solution of EDTA, 1 gram of which complexes 102 milligrams CaCO$_3$; available from Dow Chemical Co.).
**EDTA from solid powder reagent (all tests like this unless otherwise noted).
**BaSO$_4$ sample from a well.
*[7]Atomic absorption method gave - .020 (some Ca, Mg, and Sr present also).
*[8]Atomic absorption method gave - .019 (some Ca, Mg, and Sr present also).
*[9]Atomic absorption method gave - .016 (some Ca, Mg, and Sr present also).

In Table 1, tests 12-16 used solids which were obtained from an oil well in South Louisiana. It can be seen that with those solids, .013M to .015M barium EDTA complex is formed over the range of .05M to .10M EDTA in the inlet.

Tests 3-11 show that a .015M EDTA solution dissolved .026M barium and a 0.05M solution dissolved 0.015M barium. It is thus evident that the higher concentrations of EDTA do not work as efficiently as the lower. A value of 0.02M would appear to be about the maximum value of barium EDTA$^{-2}$ that can be placed in solution at 200° F. Some of the data is a little higher than this value and some a littler lower; an EDTA inlet concentration of 0.05M gave values of about 0.013M - 0.019M; an EDTA inlet concentration of 0.10M to 0.15M gave values between 0.015M and 0.028M. While there is considerable scatter in this data, a saturation value in the range of .02 is probably a reasonable estimate. This solubility decreases to about one-half this value at room temperature.

One factor which seems to have very little, if any, effect on the solubility of Ba EDTA$^{-2}$ is the addition of sodium carbonate or sodium hydroxide. In view of the occurrence of considerable magnesium in field waters, it may be advantageous to add such alkaline materials to keep the pH 10 or less to avoid any precipitation of magnesium by the alkalinity in the water. Other parameters such as the source of the EDTA, whether it be from a solid powder or from a dissolved solution (Versene-100) seems to make essentially no difference.

Tests 3-11 also suggest that the rate of dissolving of the barium sulfate is very fast. Retention times between 2 and 10 minutes produced essentially the same solubility value. In addition, visible evidence on the packs suggest that the rate of the solution of the solid barium sulfate is very fast since the pack inlets can be seen to be stripped of the white powdery barium sulfate originally in place. This is in contrast to prior conclusions that the reason for the failure of EDTA to remove barium sulfate deposits was the slow rate of dissolving.

Other methods for removing barium sulfate have also been tested in substantially the same way. Such tests included using various concentrated aqueous salt solutions to increase the solubility of the barium sulfate (no EDTA present). The most effective solutions found were 20 percent ammonium chloride and 20 percent ammonium acetate solutions. However (relative to the present EDTA solutions) those solutions removed approximately 1/10 of the amount of barium sulfate per barrel, which would make the use more difficult since much larger volumes are involved. Also, the cost of their use would probably be higher since the salt concentrations and solution volumes are so high.

Where a barium sulfate solid to be dissolved is mixed with significant amounts of other solids or scales, such as calcium or magnesium sulfates and/or carbonates and/or iron oxides, etc., slugs of aqueous chelantcontaining solutions of the present invention can advantageously be alternated, preferably with inert spacers between, with slugs of other solutions. Relatively low pH or solutions or acids can be used to dissolve the carbonates and/or oxides. Relatively highly concentrated aminopolyacetic acid salt solutions can be used to dissolve the calcium or magnesium sulfates. And, water or inert salt solutions can be used as inert spacers between such slugs.

What is claimed is:

1. A process for dissolving barium sulfate solid from a remote location into which fluid can be flowed comprising:

flowing fluid into the remote location so that a stream of fluid contacts and flows along the surfaces of the barium sulfate solid, and adjusting the composition and flow rate of the fluid so that (a) the barium sulfate solid is contacted by a stream of aqueous solution in which each portion contains enough dissolved aminopolyacetic acid salt chelating agents to be effective in dissolving barium sulfate scale, (b) substantially all upstream portions of the barium sulfate solid are contacted by succeeding portions of the aqueous solution that are substantially unsaturated with respect to the dissolved barium-chelant complex, and (c) said aqueous solution contains from about 0.02-0.05 moles per liter of the chelating agent.

2. The process of claim 1 in which the chelating agent is an ethylenediamine tetraacetic acid salt.

3. The process of claim 2 in which the chelant-containing solution contains at least about 3% by weight of dissolved inorganic alkali metal salt.

4. The process of claim 2 in which the remote location is a permeable subterranean earth formation containing particles of barium sulfate solid deposited by a barium sulfate-containing drilling mud.

5. The process of claim 1 in which the pH of the aqueous solution is from about 6 to 14.

* * * * *

Disclaimer 4,030,548.—*Edwin A. Richardson*, Houston, and *Ronald F. Scheuerman*, Bellaire, Tex. ECONOMICALLY DISSOLVING BARIUM SULFATE SCALE WITH A CHELATING AGENT. Patent dated June 21, 1977. Disclaimer filed Sept. 16, 1977, by the assignee, *Shell Oil Company*.

Hereby enters this disclaimer to all of the claims of said patent.

[*Official Gazette November 15, 1977.*]